United States Patent
Venkatesh et al.

(10) Patent No.: US 7,356,546 B2
(45) Date of Patent: *Apr. 8, 2008

(54) SYSTEM AND METHOD FOR OBJECT PERSISTENCE IN A DATABASE STORE

(75) Inventors: Ramachandran Venkatesh, Bellevue, WA (US); Beysim Sezgin, Redmond, WA (US); Jose A. Blakeley, Redmond, WA (US); Denis Y. Altudov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 404 days.

This patent is subject to a terminal disclaimer.

(21) Appl. No.: 11/028,783

(22) Filed: Jan. 4, 2005

(65) Prior Publication Data

US 2005/0120048 A1    Jun. 2, 2005

Related U.S. Application Data

(63) Continuation of application No. 10/692,225, filed on Oct. 23, 2004, now Pat. No. 6,941,316.

(51) Int. Cl.
*G06F 7/00* (2006.01)
*G06F 17/00* (2006.01)

(52) U.S. Cl. ..................... 707/103; 707/101
(58) Field of Classification Search .............. None
See application file for complete search history.

(56) References Cited

U.S. PATENT DOCUMENTS

| | | | | |
|---|---|---|---|---|
| 5,297,279 | A | 3/1994 | Bannon et al. | 707/103 |
| 5,437,027 | A | 7/1995 | Bannon et al. | 395/600 |
| 5,864,862 | A | 1/1999 | Kriens et al. | 707/103 |
| 5,900,870 | A | 5/1999 | Malone et al. | 715/866 |
| 6,047,291 | A | 4/2000 | Anderson et al. | 707/103 |
| 6,070,174 | A | 5/2000 | Starek et al. | 707/206 |
| 6,108,004 | A | 8/2000 | Medl | 715/804 |
| 6,112,024 | A | 8/2000 | Almond et al. | 717/122 |
| 6,199,100 | B1* | 3/2001 | Filepp et al. | 709/203 |
| 6,199,195 | B1 | 3/2001 | Goodwin et al. | 717/104 |
| 6,223,344 | B1* | 4/2001 | Gerard et al. | 717/170 |
| 6,338,056 | B1 | 1/2002 | Dessloch et al. | 707/2 |
| 6,370,541 | B1 | 4/2002 | Chou et al. | 707/103 |
| 6,505,211 | B1 | 1/2003 | Dessloch et al. | 707/103 |

(Continued)

OTHER PUBLICATIONS

Andrews, T. et al., "Combining Language and Database Advances in an Object-Oriented Development Environment", *OOPSLA Proceedings*, Oct. 4-8, 1987, 430-440.

(Continued)

*Primary Examiner*—Debbie Le
*Assistant Examiner*—Harold A Hotelling
(74) *Attorney, Agent, or Firm*—Woodcock Washburn LLP

(57) ABSTRACT

A new persistence format for storing objects of a user defined type in a database store enables information about the structure of the type to be communicated to the store. This information enables a number of store optimizations, including direct structural access to members of the type. Specifically, metadata is exchanged between the type implementer and the data store. The store uses the metadata to determine the storage layout for instances of the type. With this information, the store is able to detect access patterns that can be optimized to directly operate over the storage representation without hydration (deserialization) the object.

4 Claims, 8 Drawing Sheets

U.S. PATENT DOCUMENTS

| | | | |
|---|---|---|---|
| 6,519,597 B1 | 2/2003 | Cheng et al. | 707/10 |
| 6,556,983 B1 | 4/2003 | Altschuler et al. | 706/55 |
| 6,564,205 B2 | 5/2003 | Iwata et al. | 707/2 |
| 6,578,046 B2 | 6/2003 | Chang et al. | 707/4 |
| 6,671,687 B1 | 12/2003 | Pederson et al. | 707/9 |
| 6,708,196 B1 | 3/2004 | Atkinson et al. | 709/102 |
| 6,772,178 B2 | 8/2004 | Mandal et al. | 707/204 |
| 6,785,690 B1 | 8/2004 | Davidson | 707/103 Y |
| 6,941,316 B2 | 9/2005 | Venkatesh et al. | 707/101 |
| 2002/0091702 A1 | 7/2002 | Mullins | 707/100 |
| 2002/0152422 A1 | 10/2002 | Sharma et al. | 714/13 |
| 2002/0198891 A1 | 12/2002 | Li et al. | 707/102 |

OTHER PUBLICATIONS

Berg, C., "How Do I Create Persistent Java Objects?", *Dr. Dobb's Journal*, 1997, 22(4), 98-101.

Bhattacharya, S. et al., "Coordinating Backup/Recovery and Data Consistency Between Database and File Systems", *ACM SIGMOD*, Jun. 4-6, 2002, 500-511.

Biliris, A., "The Performance of Three Database Storage Structures for Managing Large Objects", *ACM SIGMOD*, 1992, 276-285.

Buneman, P. et al., "Inheritance and Persistence in Database Programming Languages", *ACM*, 1986, 4-15.

Chien, A.A., "Concurrent Aggregates (CA)-Design and Experience with a Concurrent Object-Oriented Language Based on Aggregates", *J. Parallel and Distributed Computing*, 1995, 25(2), 174-196.

Darby, C., "Object Serializatin in Java 1.1. Making Objects Persistent", *Web Techniques*, 1997, 2(9), 55, 58-59.

Findler, R.B. et al., "Contact Soundness for Object-Oriented Languages" *ACM Conference on Object-Oriented Programming Systems, Languages, and Applications, OOPSLA*, 2001, 15 pages.

Frost, R.A. "Binary-Relational Storage Structures", *The Computer Journal*, 1982, 25(3), 358-367.

Fuh, Y-C. et al., "Implementation of SQL3 Structured Types with Inheritance and Value Substitutability", *Digital Symposium Collection*, 2000, 565-574.

Harrison, C.J. et al., Structure Editors: User-Defined Type Values and Type Inference, *IEEE*, 2000, 241-247.

Haverlock, K., "Object Serialization, Java, and C++", *Dr. Dobbs. Journal*, 1998, 23(8), 32, 34, 36-37.

Hsiao, H.I. et al., "DLFM: A Transactional Resource Manager", *MOD*, 2000, 518-528.

Khan, L. et al., "A Performance Evaluation of Storing XML Data in Relational Database Management Systems", *WIDM*, 2001, 31-38.

King, et al., "TriStarp—An Investigation into the Implementation and Exploitation of Binary Relational Storage Structures", *Proc. 8 Supth BNCOD(British national Conference on Data Bases)*, 1990, 64-84.

Leontiev, Y. et al., "On Type Systems for Object-Oriented Database Programming Languages", *ACM Computing Surveys*, Dec. 2002, 34(4), 409-449.

Melton, J. et al., "SQL and Management of External Data", *SIGMOD Record*, Mar. 2001, 30(1), 70-77.

Papiani, M. et al., A Distributed Scientific Data Archive Using the Web, XML and SQL/MED, *SIGMOD Record*, Sep. 1999, 28(3), 56-62.

Seshadri, P., "Enhanced Abstract Data Types in Object-Relational Databases", *The VLDB Journal*, 1998, 7, 130-140.

Stonebraker, M., "Inclusion of New Types in Relational Data Base Systems", *IEEE International Conference on Data Engineering*, 1986, 1-19.

Varlamis, I. et al., "Bridging XML-Schema and Relational Databases. A System for Generating and Manipulating Relational Databases Using Valid XML Documents", *DocEng 'OL*, Nov. 9-10, 2001, 105-114.

Yoshikawa, M. et al., "XRel: A Path-Based Approach to Storage and Retrieval of XML Documents Using Relational Databases", *ACM Transactions on Internet Technology*, Aug. 2001, 1(1), 110-141.

* cited by examiner

```
[Serializable]
[SqlUserDefinedType(MaxByteSize=8000)]
public class BaseItem: INullable
{
        private SqlGuid m_ID;
        private SqlString m_Name;

public SqlGuid ID
        {
                get
                {
                        return m_ID;
                }
                set
                {
                        this.m_ID = value;
                }
        } public SqlGuid Name
        {
                get
                {
                        return m_Name;
                }
                set
                {
                        this.m_Name = value;
                }
        };

public MultiSet<PropertyAssociation> Properties;

#region UDT boilerplate
        public BaseItem()
        {
                this.ID = new SqlGuid(Guid.NewGuid());
        }
        public override string ToString()
        {
                return "ID " + this.ID;
        }
        protected SqlBoolean m_IsNull = SqlBoolean.False;
        public bool IsNull { get { return this.m_IsNull.Value; } }
        public static BaseItem Null
        {
                get
                {
                        BaseItem s = new BaseItem();

s.m_IsNull = SqlBoolean.True;
                        return s;
                }
        }
        public static BaseItem Parse(SqlString s)
        {
                return new BaseItem();
        }
        #endregion
}
```

Fig. 1

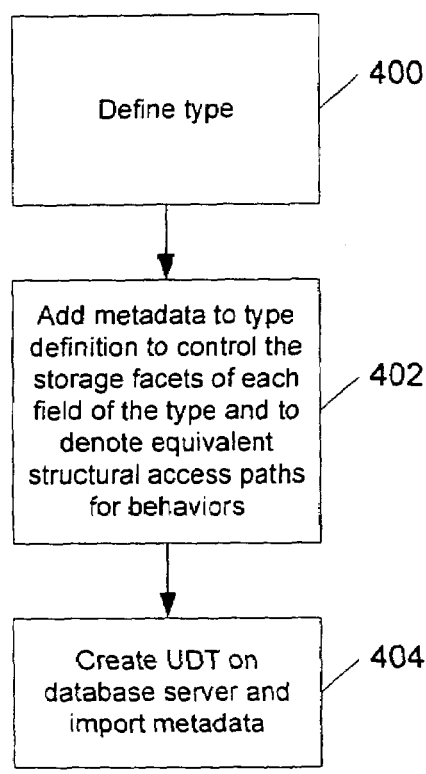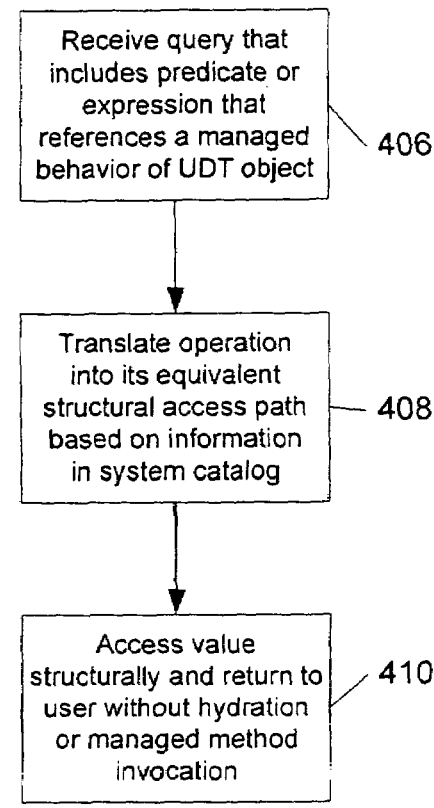
Fig. 4A
Fig. 4B

```
1.  Serializable]
2.      [SqlUserDefinedType(Format.Structured, MaxByteSize=8000)]
3.      public class BaseItem: INullable
4.      {
5.          [SqlUdtField(IsNullable=false)]
6.          private SqlGuid m_ID;
7.
8.          [SqlUdtField(MaxSize=128, IsFixedLength=false)]
9.          private SqlString m_Name;
10.
11.         [SqlUdtProperty(FieldName="m_ID")]
12.         public SqlGuid ID
13.         {
14.             get
15.             {
16.                 return m_ID;
17.             }
18.             set
19.             {
20.                 this.m_ID = value;
21.             }
22.         }
23.
24.         [SqlUdtProperty(FieldName="m_Name")]
25.         public SqlGuid Name
26.         {
27.             get
28.             {
29.                 return m_Name;
30.             }
31.             set
32.             {
33.                 this.m_Name = value;
34.             }
35.         }
36.
37.         [SqlUdtField(IsNullable=true)]
38.         public MultiSet<PropertyAssociation> Properties;
39.
40.         #region UDT boilerplate
41.         public BaseItem()
42.         {
43.             this.ID = new SqlGuid(Guid.NewGuid());
44.         }
45.         public override string ToString()
46.         {
47.             return "ID " + this.ID;
48.         }
49.         [SqlUdtField]
50.         protected SqlBoolean m_IsNull = SqlBoolean.False;
51.         public bool IsNull { get { return this.m_IsNull.Value; } }
52.         public static BaseItem Null
53.         {
54.             get
55.             {
56.                 BaseItem s = new BaseItem();
57.
58.                 s.m_IsNull = SqlBoolean.True;
59.                 return s;
60.             }
61.         }
62.         public static BaseItem Parse(SqlString s)
63.         {
64.             return new BaseItem();
65.         }
66.         #endregion
67.     }
```

Fig. 5

SYSTEM AND METHOD FOR OBJECT PERSISTENCE IN A DATABASE STORE

CROSS-REFERENCE TO RELATED APPLICATIONS

This is a continuation of prior application Ser. No. 10/692,225, filed Oct. 23, 2004, now U.S. Pat. No. 6,941,316 which is hereby incorporated by reference in its entirety.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2003, Microsoft Corp.

FIELD OF THE INVENTION

The present invention relates to data storage in a computer system, and more particularly, to a system and method for persisting objects in a database store.

BACKGROUND

Microsoft SQL SERVER is a comprehensive database management platform that provides extensive management and development tools, a powerful extraction, transformation, and loading (ETL) tool, business intelligence and analysis services, and other capabilities. Two improvements to SQL SERVER have recently been implemented. First, the Microsoft Windows .NET Framework Common Language Runtime (CLR) has been integrated into the SQL SERVER database, and second, a new object, referred to as a user defined type (UDT), can now be created with managed code in the CLR environment and persisted in the database store.

The CLR is the heart of the Microsoft NET Framework, and provides the execution environment for all .NET code. Thus, code that runs within the CLR is referred to as "managed code." The CLR provides various functions and services required for program execution, including just-in-time (JIT) compilation, allocating and managing memory, enforcing type safety, exception handling, thread management and security. The CLR is now loaded by SQL SERVER upon the first invocation of a .NET routine.

In previous versions of SQL SERVER, database programmers were limited to using Transact-SQL when writing code on the server side. Transact-SQL is an extension of the Structured Query Language as defined by the International Standards Organization (ISO) and the American National Standards Institute (ANSI). Using Transact-SQL, database developers can create, modify and delete databases and tables, as well as insert, retrieve, modify and delete data stored in a database. Transact-SQL is specifically designed for direct structural data access and manipulation. While Transact-SQL excels at structural data access and management, it is not a full-fledged programming language in the way that Visual Basic .NET and C# are. For example, Transact-SQL does not support arrays, collections, for each loops, bit shifting or classes.

With the CLR integrated into the SQL SERVER database, database developers can now perform tasks that were impossible or difficult to achieve with Transact-SQL alone. Both Visual Basic .NET and C# are modern programming languages offering full support for arrays, structured exception handling, and collections. Developers can leverage CLR integration to write code that has more complex logic and is more suited for computation tasks using languages such as Visual Basic .NET and C#.

In addition to CLR integration, SQL SERVER also adds support for user defined types (UDT)—a new mechanism that enables a developer to extend the scalar type system of the database. UDTs provide two key benefits from an application architecture perspective: they provide strong encapsulation (both in the client and the server) between the internal state and the external behaviors, and they provide deep integration with other related server features. Once a UDT is defined, it can be used in all the contexts that a system type can be used in SQL SERVER, including in column definitions, variables, parameters, function results, cursors, triggers, and replication.

The process of defining a UDT on a database server is accomplished as follows:
  a) create a class in managed code that follows the rules for UDT creation;
  b) load the Assembly that contains the UDT into a database on the server using the CREATE ASSEMBLY statement; and
  c) create a type in the database using the CREATE TYPE statement that exposes the managed code UDT.

At this point, the UDT can be used in a table definition.

When a UDT definition is created in managed code, the type must meet the following requirements:
  a) it must be marked as Serializable;
  b) it must be decorated with the SqlUserDefinedTypeAttribute;
  c) the type should be NULL aware by implementing the INullable interface;
  d) the type must have a public constructor that takes no arguments; and
  e) the type should support conversion to and from a string by implementing the following methods:
    1. Public String ToString(); and
    2. Public Shared <type> Parse (SqlString s).

FIG. 1 is an example of a class that defines a UDT in accordance with the process described above. In accordance with the steps described above, this class is then compiled into a dynamic link library (dll). An Assembly containing the compiled class is then created using the following T-SQL script commands:
  create assembly test
  from 'c:test.dll'
  go The following T-SQL script commands are then used to create the UDT on the server:
  create type BaseItem
  external name [test]:[BaseItem]
  go Once the UDT has been created on the server, a table (e.g., "MyTable") can be created defining an attribute of the table as the UDT type, as follows:

```
create table MyTable
(
    Item BaseItem,
    ItemId as item::ID
)
go
```

A new item can be added to the table, as follows:

declare @i BaseItem
set @i=convert(BaseItem,")
insert into MyTable values (@i)
go The UDT expression can then be used in a query such as: SELECT Item.ID, Item.Name FROM MyTable.

With the integration of the CLR into SQL SERVER and the ability to define UDTs from a class definition in managed code, applications can now instantiate objects of the type defined by the managed code class and have those objects persisted in the relational database store as an instance of the UDT. Moreover, the class that defines the UDT can also include methods that implement specific behaviors on objects of that type. An application can therefore instantiate objects of a type defined as a UDT and can invoke managed behaviors over them.

When an object of a class that has been defined as a UDT is instantiated in the CLR, the object can be persisted in the database store through the process of object serialization, wherein the values of the variables of the class are transferred to physical storage (e.g., hard disk). FIG. 2 illustrates the serialization of an object in memory to its persisted form on disk. The object may be persisted in the database store in a traditional relational database table of the format illustrated in FIG. 3. As shown, the table comprises a column of the specified UDT. The serialized values of a persisted object of the specified UDT occupy a cell of the UDT column.

Referring again to FIG. 2, when an application generates a query that includes a predicate or an expression that references a managed behavior of a UDT object that has been persisted in the database store (e.g., a behavior that returns the value of a field of the UDT object), the persisted object must be de-serialized (sometimes also referred to as "hydrating") and the CLR must allocate memory for the full object in order to receive its stored values. The CLR must then invoke the actual method that implements the behavior desired by the application. Unfortunately, the processing overhead associated with allocating memory to store the full object at run time, deserializing and populating all parts of the object, and then invoking the method that implements the requested behavior, can be burdensome. Consequently, there is a need for systems and methods that provide more efficient storage and retrieval of objects persisted in a database store. The present invention satisfies this need.

SUMMARY

The present invention is directed to a system and method that provides a new persistence format for user defined types (UDTs) within a database store that enables information about the structure of a UDT to be communicated to the underlying data store. This information enables a number of store optimizations, including direct structural access to members of the type. Specifically, the present invention enables metadata exchange between the type implementer and the data store. The store uses the metadata to determine the storage layout for instances of the type. With this information, the store is able to detect access patterns that can be optimized to directly operate over the storage representation without hydration (deserialization) of the object. Moreover, by understanding operations that are structural access-only operations, the system is able to build data distribution statistics and indexes over the individual members without requiring redundant persistence of the computed value.

Other features and advantages of the invention may become apparent from the following detailed description of the invention and accompanying drawings.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary embodiments of various aspects of the invention; however, the invention is not limited to the specific methods and instrumentalities disclosed. In the drawings:

FIG. 1 is an exemplary code segment illustrating a managed code class definition for a user defined type;

FIG. 4A is a flow diagram illustrating one embodiment of an aspect of the method of the present invention;

FIG. 4B is a flow diagram illustrating one embodiment of another aspect of the method of the present invention;

FIG. 5 is an exemplary code segment illustrating a managed code class definition for a user defined type that has been annotated in accordance with the present invention;

DETAILED DESCRIPTION OF THE INVENTION

Figure 2:
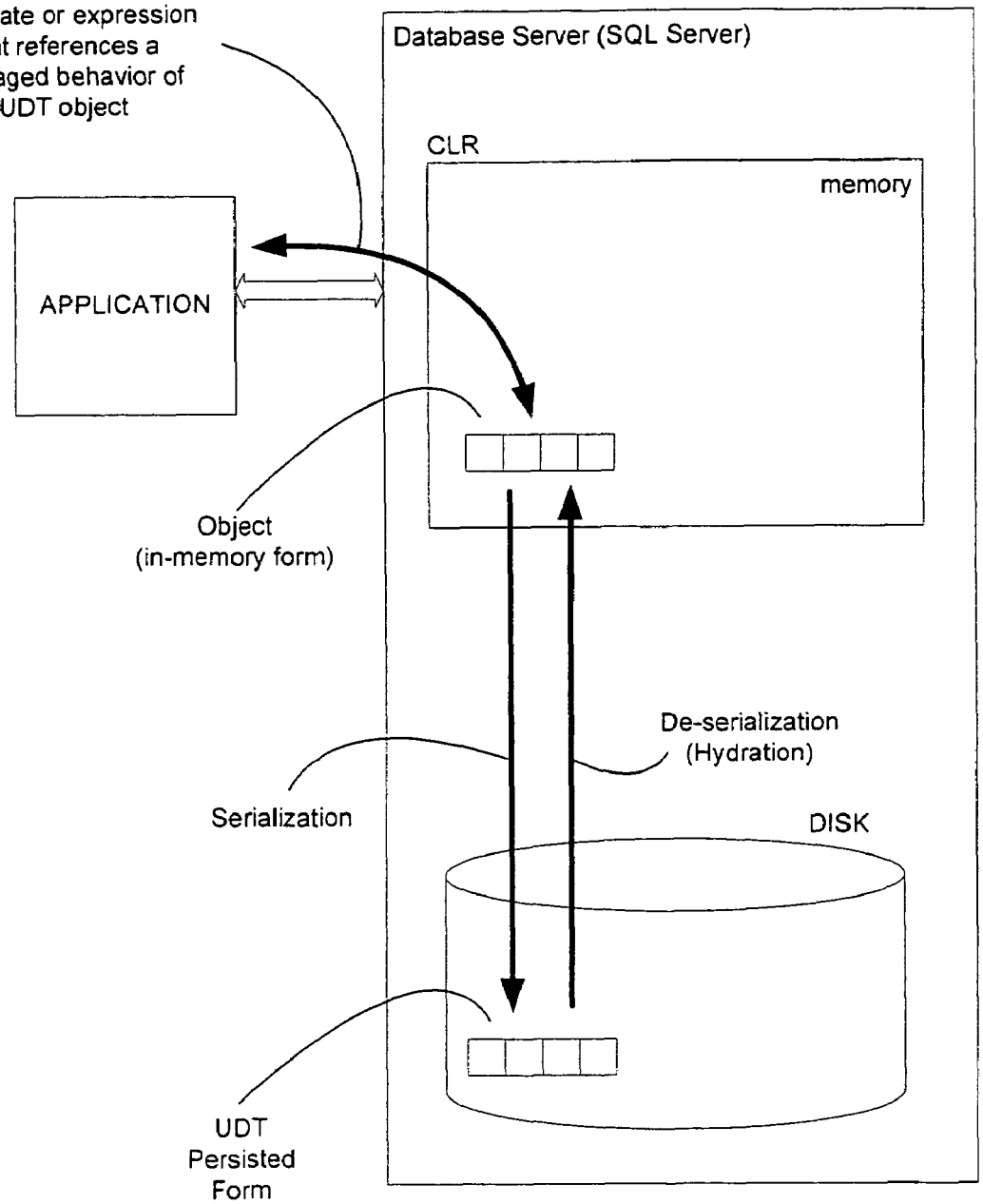
FIG. 2 is a block diagram illustrating the serialization and deserialization of an instance of a user defined type that has been instantiated in managed code.
Figure 3:
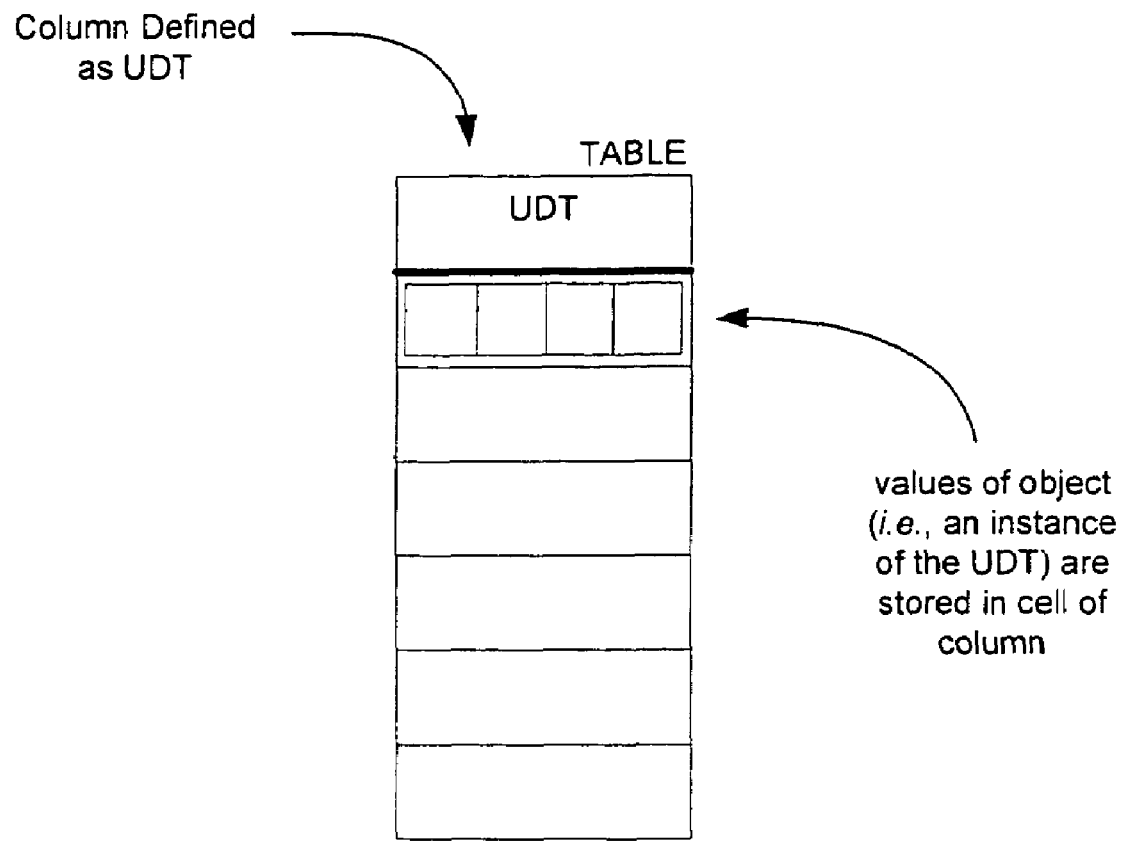
FIG. 3 is a diagram illustrating a database table in which an object of a user defined type has been persisted.

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As stated above, the present invention is directed to a system and method that provides a new persistence format for user defined types (UDTs) within a database store that enables information about the structure of a UDT to be communicated to the underlying data store. This information enables a number of store optimizations, including direct structural access to members of the type. Specifically, the present invention enables metadata exchange between the type implementer and the data store. The store uses the metadata to determine the storage layout for instances of the type. With this information, the store is able to detect access patterns that can be optimized to directly operate over the storage representation without hydration (deserialization) of the object. Moreover, by understanding operations that are structural access-only operations, the system is able to build data distribution statistics and indexes over the individual members without requiring redundant persistence of the computed value. The term "direct structural access" refers to the ability of the database store to execute a query over an object by direct access to the persisted values of the object in a table of the data store, without having to hydrate (deserialize) the object.

FIG. 4A is a flow diagram illustrating one embodiment of a method of the present invention. As illustrated, the method begins at step 400 with the definition of a user defined type. As with most UDTs, the type is defined as a CLR class in managed code using, for example, a high-level programming language such as Visual Basic .NET or C#. According to the present invention, however, in order to apply the new persistence format of the present invention to this class definition, the class definition is annotated in step 402 to provide metadata that describes the storage layout of the UDT. Preferably, the metadata describes the storage facets of the fields of the type, such as size, precision, scale, etc. as well as denoting equivalent structural access paths for every behavior of the type. FIG. 5 is an exemplary code listing in which the CLR class shown FIG. 1 has been annotated in accordance with the present invention. In the present embodiment, there are three aspects to this annotation.

First, the class definition is annotated to identify the UDT as one to which the new persistence format of the present invention will be applied. In the present embodiment, this is achieved by adding the parameter "Format.Structured" to the [SqlUserDefinedType()] attribute of the class definition, as show in line 2 of the exemplary class definition of FIG. 5. This identifies the UDT to the data store as one to which the persistence format of the present invention is to be applied.

Second, each field of the class is annotated with a storage attribute that controls the storage facets of the type, such as size, precision, scale, etc. In the present embodiment, this is achieved by annotating each field with a custom storage attribute named SqlUdtField(). This attribute annotates fields with additional storage directives. These directives are enforced when the object is serialized to disk. In the present embodiment, the properties (i.e., the directives that can be issued) of the SqlUdtField() custom attribute are as follows:

| Name | Description | Default value |
| --- | --- | --- |
| IsFixedLength | Is this a fixed length field? | False |
| MaxSize | The maximum size, in logical units for the underlying field type, bytes for the binary field types, and characters for the character field types. | X |
| Precision | Precision, valid only for numeric types | X |
| Scale | Scale, valid only for numeric types | X |
| IsNullable | Can values of this field be null? | True |

It is understood, however, that the present invention is by no means limited to the properties show. Rather, in other embodiments additional or other properties may be specified with this attribute.

In the present embodiment, the following field types are permitted in a Format.Structured UDT: SqlBoolean, Sql-Byte, SqlInt16, SqlInt32, SqlInt64, SqlSingle, SqlDouble, SqlDateTime, SqlMoney, SqlGuid, SqlDecimal, SqlString, SqlBinary, SqlXmlReader, SqlBytes, SqlChars, SqlUtcDateTime, SqlDate, SqlTime, and Embedded UDTs. Of course, in other embodiments, some of these field types may not be permitted and other field types may be permitted. The following table reflects the matrix of valid values of the various properties for specific field types. "Y" means the property is valid, "N" means the property is not valid, "R" means the property is required. If the property is invalid, type registration will report an error if a non-default value for the property is specified. In other embodiments, these limitations and constraints may differ.

| Type | IsFixedLength | MaxSize | Precision | Scale | IsNullable |
| --- | --- | --- | --- | --- | --- |
| SqlBoolean | N | N | N | N | Y |
| SqlByte | N | N | N | N | Y |
| SqlInt16 | N | N | N | N | Y |
| SqlInt32 | N | N | N | N | Y |
| SqlInt64 | N | N | N | N | Y |
| SqlSingle | N | N | N | N | Y |
| SqlDouble | N | N | N | N | Y |
| SqlDateTime | N | N | N | N | Y |
| SqlMoney | N | N | N | N | Y |
| SqlGuid | N | N | N | N | Y |
| SqlDecimal | N | N | Y | Y | Y |
| SqlString | Y | R | N | N | Y |
| SqlBinary | Y | R | N | N | Y |
| SqlXmlReader | Y | Y | N | N | Y |
| SqlBytes | Y | R | N | N | Y |
| SqlChars | Y | R | N | N | Y |
| SqlUtcDateTime | N | N | N | N | Y |
| SqlDate | N | N | N | N | Y |
| SqlTime | N | N | N | N | Y |
| Embedded UDTs | N | N | N | N | Y |

Referring to the exemplary code listing of FIG. 5, the SqlUdtField() custom attribute has been added at lines 5, 8, 37, and 49 to annotate the respective fields of the exemplary UDT class definition.

As a third aspect of the class definition annotation, every managed behavior (e.g., a method that can be invoked on the UDT object to return the value of a field) defined in the CLR class is annotated with an attribute that denotes an equivalent structural access path for that managed behavior. In the present embodiment, the custom attribute used for this purpose is named SqlUdtProperty(), and the database server (e.g., SQL SERVER) assumes that the implementation of properties annotated with this custom attribute will delegate to a field specified as part of the attribute definition. This lets the server optimize access to the property structurally without creating an instance and invoking the behavior on it. The properties of the SqlUdtProperty() custom attribute are as follows:

| Name | Description |
| --- | --- |
| FieldName | the name of the field that is used to store the value for this property. |

The presence of the SqlUdtProperty denotes that the body of the property can be ignored, and the name of the field is used as the structural access path. In the present embodiment, property accessors are the only behaviors that can be accessed structurally. However, in other embodiments, other types of methods may be capable of structural access.

Referring to the exemplary code listing of FIG. 5, the SqlUdtProperty() custom attribute has been added at lines 11 and 24 to annotate the respective managed behaviors of the class.

Referring again to FIG. 4A, at step 404 the UDT as defined by the UDT author is created on the database server and the metadata reflected in the class definition annotations is imported into the database store, which uses the metadata to determine the storage layout for instances of the type. Specifically, the SqlUdtField attribute in combination with the actual type of a given field is used to control the storage layout of the persisted value of that field. For example, if the attribute indicates that a field is nullable, the component of the database system that handles storage can reserve a bit in the area used to store null values for this field. As another example, if the field is of a varying sized type (like string), the attribute may indicate that the field is actually fixed size. This information can again be used by the database system to optimize access to this field by storing the field in the fixed size portion of the value. The specifics of how the facets on the SqlUdtField attribute affect the storage layout are dependent upon the particular storage layout choices of the database system. It is understood, therefore, that the foregoing discussion provides merely two examples of how such an attribute can control the storage layout of an instance of a UDT; the present invention is by no means limited thereto.

In the present embodiment, step 404 of the method is carried out by (1) compiling the CLR class file that defines the UDT into a dynamic link library (.dll), (2) creating an Assembly that contains the UDT and registering the Assembly with the store, and then (3) creating the UDT over the managed type. As part of step(3), the storage facets of the type are validated and the metadata information reflected in the annotations to the CLR class definition are imported into the database system catalog that describes the structure of the type. In the present embodiment, these steps can be carried out using the following T-SQL script commands:

```
--create the assembly
create assembly test
from 'c:\test.dll'
go
-- create the UDT
create type BaseItem
external name [test]:[BaseItem]
go
```

Instances of the UDT can then be instantiated in managed code, and those objects can be persisted in a table of the database store, as with any UDT. It is understood that in other embodiments, particularly those that may employ database servers other than SQL SERVER, the details of how the UDT is registered and how the metadata information is exchanged with the database store may be different.

FIG. 4B is a flow diagram illustrating a method for accessing values of a UDT to which the new persistence format of the present invention has been applied, e.g., UDTs annotated with the "Format.Structured" property as discussed above. According to the inventive method, as shown in step 406, the database server receives a query that includes a predicate or an expression that references a managed behavior of an object persisted in the database store, to which the method of the present invention has been applied. For example, suppose a Format.Structured UDT named "Person" has been created and that it includes a field of type SqlString called "Name," which has been properly annotated with the SqlUdtField() attribute as described above. Assume also that the Person type has a managed behavior that returns the value of the "Name" field of an instance of the type and that the behavior has been properly annotated with the SqlUdtProperty() attribute. The database server may receive the following query on the Person object:
    SELECT Person.Name FROM T where T is a table that contains a UDT column called Person.

As described above in the Background section, in the case of SQL SERVER, for UDTs to which the new persistence format of the present invention is not applied, the query would be processed as follows. At query compilation time, the assembly metadata for the UDT is examined to determine that Name is a valid property on the type. A helper function is then created on the fly to invoke the Name property on the deserialized instance of the Person object. Deserialization is implemented by a type-specific deserializer that is also generated on the fly. As discussed above, the process of deserialization involves using the contents of the on-disk representation to populate the internals of the new managed object. Internally, the query:
    SELECT person.Name FROM T gets converted to:
    SELECT deserializeInto(new person()), personDatum)→
        invokeFunction(Name) FROM T All the new code that is generated is encapsulated in a function InvokeUdfExternal, which is used at runtime to evaluate this expression.

In accordance with the present invention, however, as illustrated at step 408, the query is processed differently. Specifically, the query operation is translated into its equivalent structural access path based on the metadata stored in the system catalog of the database. In the presently described embodiment in which the invention is implemented in the SQL SERVER database, at query compilation time, the assembly metadata for the UDT is examined to determine that Name is a property that can be rewritten for structural access. If it can be executed structurally, sql metadata and assembly metadata are used to determine the physical access information (location, type and size of the value, along with the access path to get to it). This structural metadata is used to compile an accessor and store this information in the compiled expression. In the present embodiment, therefore, the same query above gets compiled instead into:
    Select binding.GetData(personDatum, NameOrdinal)
        from T Next, at step 410, the value of the requested field can now be accessed structurally and returned to the user without the need for object hydration and without invoking any behaviors in managed code. Specifically, in the present embodiment, the accessor is used at runtime to fetch the field. Internally, the implementation of the accessor parses the serialized form and returns the property.

Figure 6:
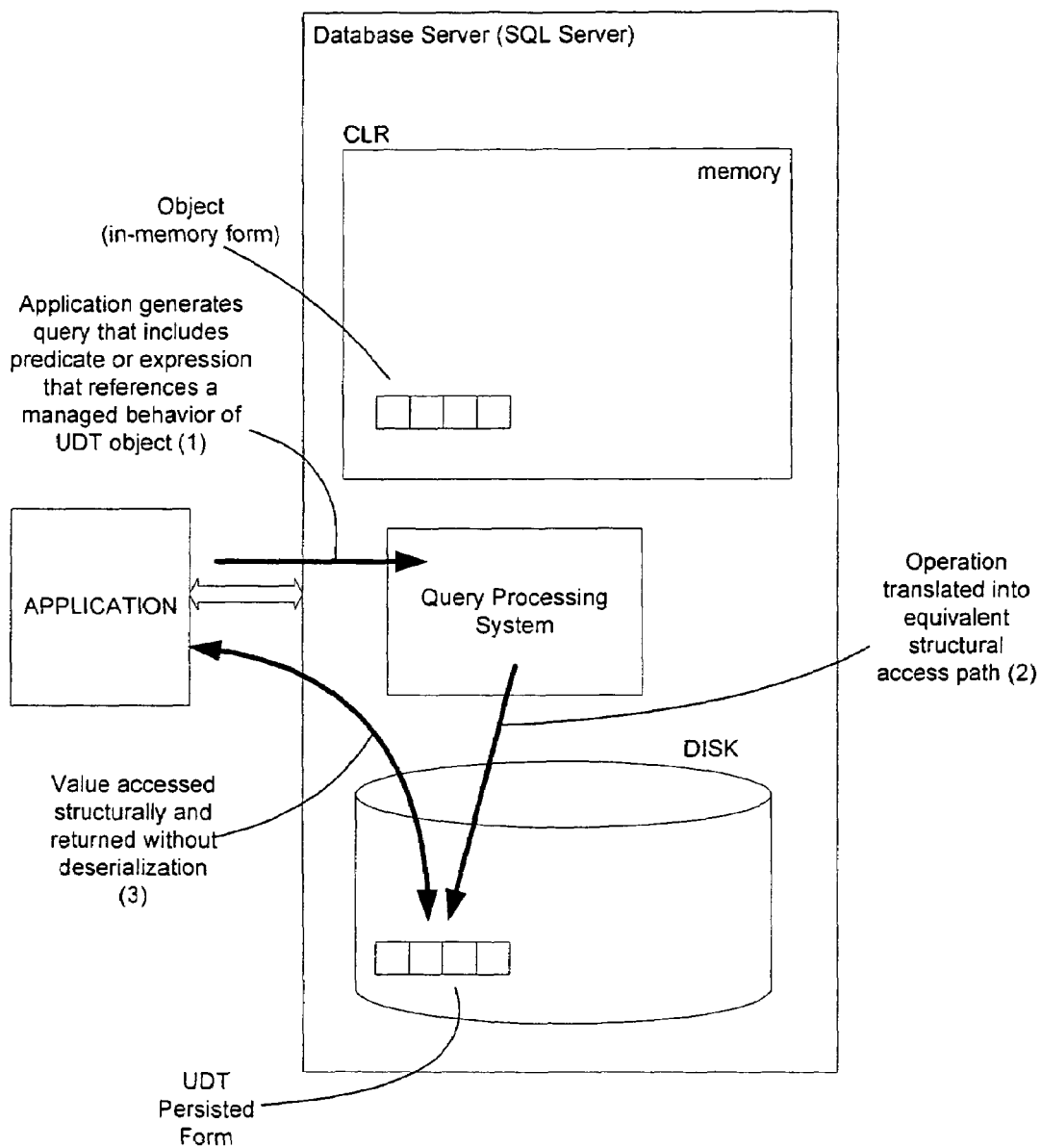
FIG. 6 is a block diagram of a system in which the present invention can be implemented, as well as illustrating the structural access and return of a value of a persisted object of a UDT in accordance with the method of the present invention.

FIG. 6 is a block diagram that illustrates a system that implements the method illustrated in FIG. 4B. As shown at (1), an application generates a query that includes a predicate or an expression that references a managed behavior of an object persisted in the database store, to which the present invention has been applied. A query processing system of the database server uses the stored metadata associated with the UDT to translate the query into an equivalent structural access path, as shown at (2). The value is then accessed structurally and returned to the application without object hydration and without invoking the behavior on the object, as shown at (3).

Developers can build upon the ability of the present invention to provide structural access to fields of a UDT object without object hydration, to enable additional optimizations. For example, with the present invention, developers have the ability to build computed column indexes over structurally accessible UDT operations without requiring the column to be persisted redundantly. The direct structural access to a value provided by the present invention can be used to retrieve interesting information from the value, such as the actual type of the value, or whether the value contains embedded large values. The present invention can also be used to provide structural transformations of a value in response to servicing and data upgrade scenarios. Additionally, the present invention can be used to migrate and import/export values from one domain (store) to another more efficiently.

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for persisting objects in a database store in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the object persistence methods of the present invention.

Figure 7:
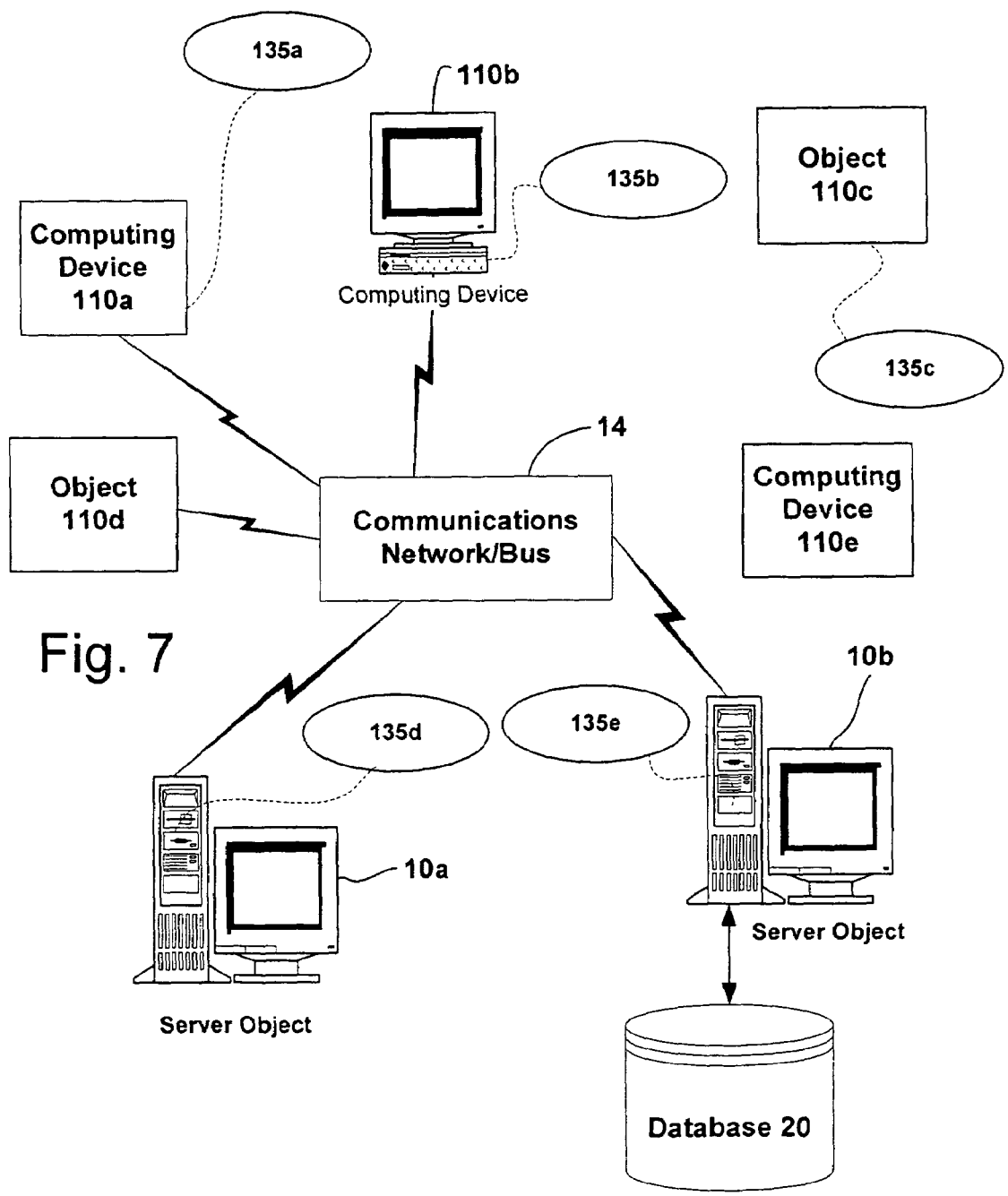
FIG. 7 is a block diagram representing an exemplary network environment having a variety of computing devices in which the present invention may be implemented.

FIG. 7 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 7, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the processes used to implement the object persistence methods of the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 7, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the object persistence techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the persistence mechanism of the invention may be distributed across multiple computing devices.

Client(s) and server(s) may communicate with one another utilizing the functionality provided by a protocol layer. For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 7 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to maintain a persisted object.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Figure 8:
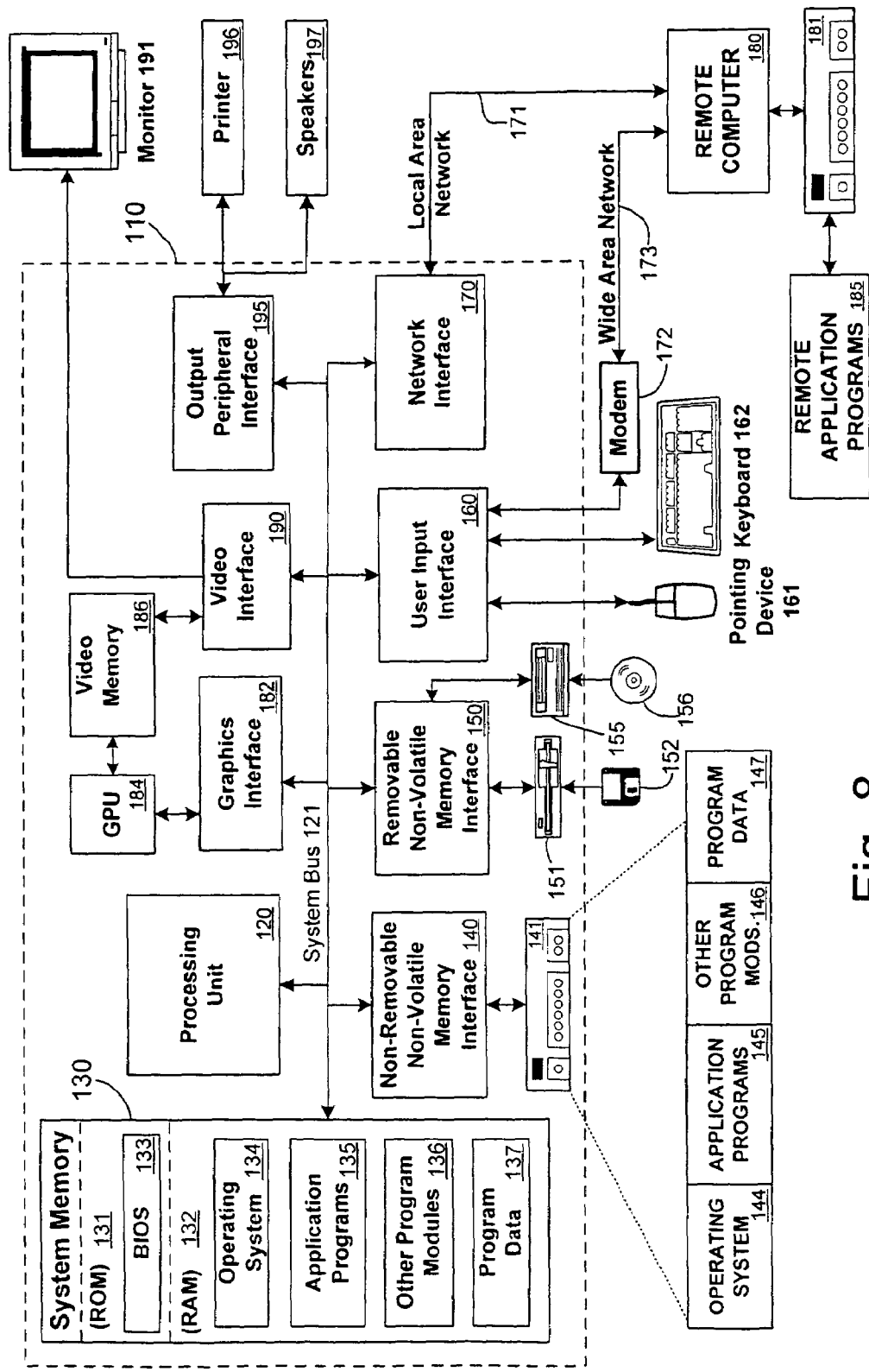
FIG. 8 is a block diagram representing an exemplary computing device in which the present invention may be implemented.

FIG. 8 and the following discussion are intended to provide a brief general description of a suitable computing device in connection with which the invention may be implemented. For example, any of the client and server computers or devices illustrated in FIG. 7 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 8 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 8, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are imnmediately accessible to and/or presently being operated on by processing unit 120. By way of example, and not limitation, FIG. 8 illustrates operating system 134, application programs 135, other program modules 136, and program data 137.

The computer 110 may also include other removable/non-removable, volatile/nonvolatile computer storage media. By way of example only, FIG. 8 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 8 provide storage of computer readable instructions, data structures, program modules and other data for the computer 110. In FIG. 8, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 8. The logical connections depicted in FIG. 8 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 8 illustrates remote application programs 185 as residing on memory device 181. It will be appreciated that the network connections shown are exemplary and other means of establishing a communications link between the computers may be used.

As the foregoing illustrates, the present invention is directed to a new persistence format for user defined types in a database management system. It is understood that changes may be made to the embodiments described above without departing from the broad inventive concepts thereof. For example, while an embodiment of the present invention has been described above as being implemented in Microsoft's SQL SERVER database management system, it is understood that the present invention may be embodied in any database management system that supports the creation of user defined types. Accordingly, it is understood that the present invention is not limited to the particular embodiments disclosed, but is intended to cover all modifications that are within the spirit and scope of the invention as defined by the appended claims.

What is claimed is:

1. A computer-implemented method for persisting an object in a database store, comprising:
    creating a definition of a user-defined type of an object that is persisted in the database store, wherein the definition of the user-defined type comprises fields and methods, each field of the definition of the type user-defined comprising one or more storage facets;
    annotating at least one field of the definition of the user-defined type with a first attribute that controls said one or more storage facets of the field;
    annotating at least one method with a second attribute that denotes an equivalent structural access path; and
    wherein the database store uses the annotations in the definition of the user-defined type to control the storage layout of instances of the user-defined type in the database store.

2. The computer-implemented method recited in claim 1, wherein said one or more storage facets of the field that are controlled by the first attribute comprise at least one of the maximum size of the field, whether the field length is fixed or variable the field is fixed length, the precision of the field, the scale of the field, and when values of the field are null.

3. The computer-implemented method recited in claim 1, wherein the second attribute specifies the name of a field of the user-defined type that is the subject of the method.

4. The computer-implemented method of claim 1, wherein the definition of the user-defined type is created as a class in managed code.

* * * * *

UNITED STATES PATENT AND TRADEMARK OFFICE
CERTIFICATE OF CORRECTION

| | | |
|---|---|---|
| PATENT NO. | : 7,356,546 B2 | |
| APPLICATION NO. | : 11/028783 | |
| DATED | : April 8, 2008 | |
| INVENTOR(S) | : Ramachandran Venkatesh et al. | |

It is certified that error appears in the above-identified patent and that said Letters Patent is hereby corrected as shown below:

In column 16, lines 8-9, in Claim 1, delete "type user-defined" and insert --user-defined type--, therefor.

Signed and Sealed this
Twenty-second Day of February, 2011

David J. Kappos
*Director of the United States Patent and Trademark Office*